US008600886B2

(12) United States Patent
Ramavarjula et al.

(10) Patent No.: US 8,600,886 B2
(45) Date of Patent: *Dec. 3, 2013

(54) MANAGING TRANSACTION ACCOUNTS

(75) Inventors: Bharathi Ramavarjula, Issaquah, WA (US); Jeffrey A. Hughes, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,000

(22) Filed: Sep. 15, 2012

(65) Prior Publication Data

US 2013/0060698 A1 Mar. 7, 2013

Related U.S. Application Data

(60) Continuation of application No. 12/642,721, filed on Dec. 18, 2009, now Pat. No. 8,321,343, which is a division of application No. 11/480,753, filed on Jun. 30, 2006, now Pat. No. 7,644,042.

(51) Int. Cl.
*G06Q 40/00* (2012.01)
(52) U.S. Cl.
USPC .............................................. 705/40; 705/44
(58) Field of Classification Search
USPC ....................................................... 705/40, 44
See application file for complete search history.

(56) References Cited

U.S. PATENT DOCUMENTS

| | | | |
|---|---|---|---|
| 6,571,222 B1 * | 5/2003 | Matsumoto et al. | 705/80 |
| 6,868,408 B1 | 3/2005 | Rosen | |
| 7,024,174 B2 | 4/2006 | Nagy et al. | |
| 2002/0013767 A1 | 1/2002 | Katz | |
| 2002/0087894 A1 * | 7/2002 | Foley et al. | 713/202 |
| 2005/0027650 A1 | 2/2005 | Walker | |
| 2005/0097049 A1 | 5/2005 | Writer et al. | |
| 2005/0182660 A1 | 8/2005 | Henley | |
| 2006/0143117 A1 * | 6/2006 | Chigira et al. | 705/39 |

OTHER PUBLICATIONS

David Steiner, Reached your (PayPal) Limit?, EcommerceBytes. com, Dec. 16, 2001.*
Kim, D.J., et al., Information Assurance in B2C Websites for Information Goods/Services, Electronic Markets 14(4):344-359, 2004.
Steiner, D., Reached Your (PayPal) Limit?, EcommerceBytes.com, Dec. 16, 2001.

* cited by examiner

*Primary Examiner* — Jason M Borlinghaus
*Assistant Examiner* — Hao Fu
(74) *Attorney, Agent, or Firm* — Knobbe, Martens, Olson & Bear, LLP

(57) ABSTRACT

A transaction account verification system and method are provided. A user computing device transmits an account registration request that includes a selection of an account verification technique. A service provider obtains the request and initiates a set of transactions with an identified financial service provider. The service provider generates at least one verification token reflective of the set of transactions and at least one piece of information associated with the selected account verification technique. The user computing device generates at least one user verification token from user input regarding the set of transactions and at least one piece of information associated with the selected account verification technique. The service provider can verify the transaction account and set transaction thresholds based upon matching verification tokens.

24 Claims, 8 Drawing Sheets

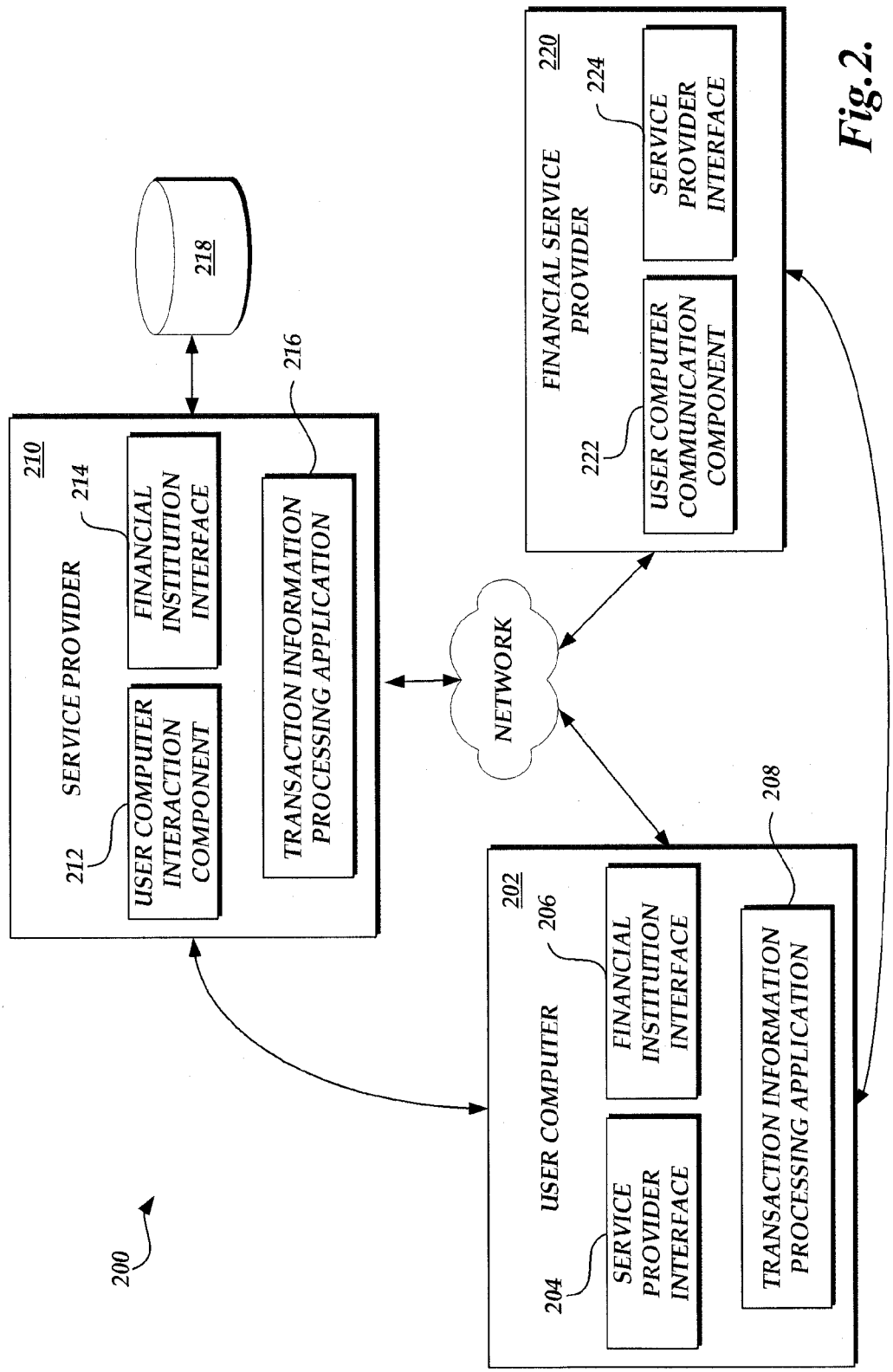

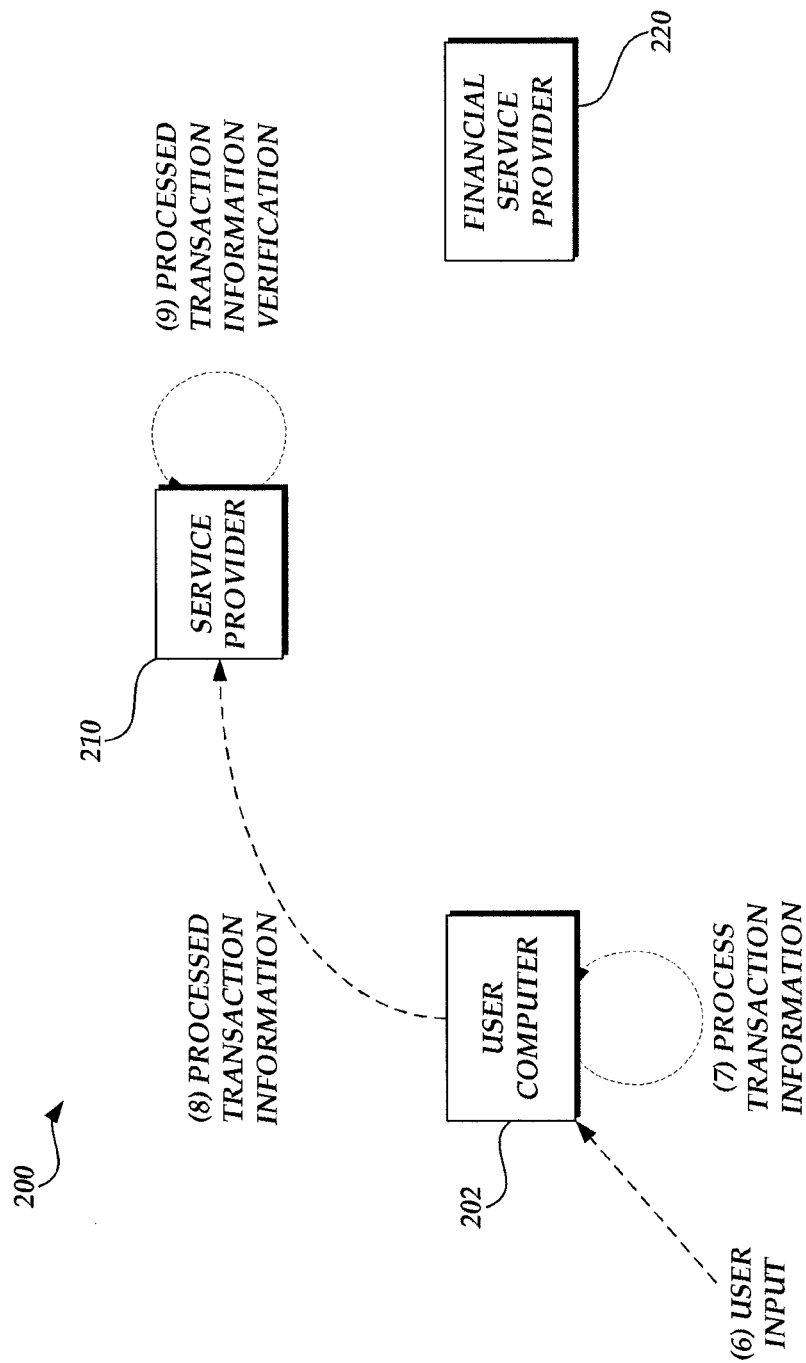

MANAGING TRANSACTION ACCOUNTS

CROSS-REFERENCE TO RELATED APPLICATIONS

This application is a continuation of U.S. patent application Ser. No. 12/642,721, filed Dec. 18, 2009, which is a divisional of application Ser. No. 11/480,753, now U.S. Pat. No. 7,644,042, filed Jun. 30, 2006, each of which is incorporated herein in its entirety.

BACKGROUND OF THE INVENTION

Generally described, computing devices and communication networks can be utilized to facilitate various transactions between parties. In a simple embodiment, two parties can exchange financial information, such as identification information and account information, to complete a financial transaction via the communication network. In some instances, however, at least one of the parties may not be comfortable with exchanging financial information. For example, an individual may not be comfortable providing financial information to a merchant that is either unknown to the individual or known to pose a questionable business risk. Similarly, many individuals may not be comfortable exchanging financial information with unknown individuals via the communication network, such as via e-mail or through auction-based Web sites.

To facilitate increased financial transactions between various entities on a communication network, such as the Internet, a number of third-party service providers provide individuals and businesses (e.g., users) with an intermediary service in which the third-party service provider manages financial transactions. In accordance with a typical implementation, the third-party service provider individually establishes an "on-line" account with each user that corresponds to a financial account with a financial service provider, such as a bank, credit card service, and the like. The users can, in turn, complete financial transactions with their on-line account without having to share any underlying financial account information. Instead, the third-party service provider settles reported on-line account transactions with the corresponding financial accounts.

To establish on-line accounts with users, the third-party service providers typically require a registration process in which individuals or businesses are required to provide various contact and financial information associated with a financial service provider that will be used to settle the on-line transactions (e.g., transfer money to/from the user). In some embodiments, users are required to transfer funds in advance to the service provider which can be held in trust with a financial service provider. Additionally, in other embodiments, users may be required to identify a checking account that will be used to settle on-line account transactions.

To mitigate fraud risks associated with registering users using checking accounts, many service providers implement an account verification technique that can establish whether a user has control of the financial account used during the registration process. FIG. 1 is a block diagram illustrative of a conventional system 100 for verifying user transaction accounts including a user computing device 102, a service provider computing device 104, and a financial services computing device 106. In accordance with this embodiment, the user computing device issues an account registration request to the service provider computing device 104. In turn, the service provider computing device 104 communicates with the financial service provider computing device 106 to initiate one or two financial transactions with the financial account provider. The financial service provider 106 independently provides a record of the transaction to the service provider computing device 104 and the user computing device 102 (e.g., through an electronic or paper statement). To validate that the user has control of the account, the user computing device 102 transmits to the service provider computing device 104 data from the transaction record, such as the transaction amounts for each transaction.

Although the above-discussed approach to account access verification can help third-party service providers establish that a user has control of an underlying financial account, third-party service providers often require additional security information from users as part of their account registration practices. For example, a third-party service provider may wish to verify the contents of additional communications with the user, such as correspondence to electronic mail accounts or physical mailing addresses. In another aspect, the third-party service provider may want the user to answer detailed security questions or to provide passwords associated with an on-line account profile. Current account access verification techniques generally do not facilitate the processing of the additional security information as part of a verification routine.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A transaction account verification system and method are provided. A user computing device transmits an account registration request that includes a selection of an account verification technique. A service provider obtains the request and initiates a set of transactions with an identified financial service provider. The service provider generates a verification token reflective of the set of transactions and at least one piece of information associated with the selected account verification technique. The user computing device generates a user verification token from user input regarding the set of transactions and at least one piece of information associated with the selected account verification technique. The service provider can verify the transaction account and set transaction thresholds based upon matching verification tokens.

In a first aspect of the disclosed subject matter, a system for managing transaction accounts is provided. The system includes a user computing device that includes a service provider interface for communicating with a service provider via a communication network. To manage the transaction account, the user computing device transmits to the service provider a user selection of an account verification technique for establishing a transaction account associated with a financial service provider. Thereafter, the user computing device obtains user input corresponding to one or more financial transactions initiated by the service provider with a financial service provider and associated with the user transaction account. The user computing device also obtains user input corresponding to at least one additional piece of information associated with the selected account verification technique. The user computing device then generates a user verification token representative of the user input and transmits the verification token to the service provider computing device.

The system also includes a service provider computing device that is associated with the service provider. The service provider computing device includes a user computing device interface for obtaining the user selection of an account verification technique from the user computing device. The service provider computing device also includes a financial service provider interface for communicating with one or more financial service providers. In response to a request from the user computing device, the service provider computing device initiates one or more financial transactions with the financial service provider associated with a user transaction account. The service provider computing device also initiates the processing of at least one additional piece of information associated with the user-selected account verification technique. Thereafter, the service provider computing device generates a service provider verification token representative of the one or more financial transactions with the financial service provider associated with the user transaction account and at least one additional piece of information associated with the user computing device. Upon receipt of the user verification token, the service provider computing device validates a user transaction account if the user verification token matches the service provider verification token.

In accordance with another aspect of the disclosed subject matter, a method for managing user transaction accounts is provided. In accordance with the method, a user computing device obtains a user registration request. The registration request can include an identification of a user transaction account associated with a financial service provider and a selection of a transaction account verification technique. The user computing device transmits the registration request to a service provider computing device. Thereafter, the user computing device obtains user input corresponding to an aspect of the financial transaction and at least one additional piece of information corresponding to the selected transaction account verification technique. The user computing device then generates a user verification token representative of the user input and transmits the user verification token representative of the user input to the service provider without transmitting the user input.

In accordance with another aspect of the disclosed subject matter, another method for managing user transaction accounts is provided. In accordance with the method, a service provider computing device obtains a registration request from a user computing device. The registration request can include an identification of a user transaction account associated with a financial service provider and a selection of a transaction account verification technique. The service provider computing device initiates at least one financial transaction with the user transaction account associated with the financial service provider and generates a service provider verification token representative of an aspect of the financial transaction and at least one additional piece of information corresponding to the selected transaction account verification technique. The service provider computing device then obtains a user verification token from the user computing device and validates the user transaction account if the service provider verification token matches the user verification token.

In accordance with a further aspect of the disclosed subject matter, a computer-readable medium having computer-executable components for managing user transaction accounts is provided. The computer-executable components include a user computing device interface component for obtaining user inputs for selecting a user transaction account verification technique. The user computing device interface component also obtains user inputs corresponding to aspects of at least one transaction with a financial service provider and at least one additional piece of information associated with a selected verification technique from a user computing device. The computer-executable components also include a financial service provider interface for initiating at least one financial transaction associated with a user transaction account. The computer-executable components further include a data processing application for generating a verification token representative of the user inputs corresponding to aspects of at least one transaction with a financial service provider and at least one additional piece of information associated with a selected verification technique. The data processing application can determine whether the service provider verification token matches a user verification token provider.

In accordance with a still further aspect of the disclosed subject matter, a method for validating a user transaction account is provided. In accordance with the method, a user computing device obtains user input corresponding to transaction details corresponding to a first transaction associated with a user transaction account. The user computing device then obtains user input corresponding to transaction details corresponding to a second transaction associated with a user transaction account and user input corresponding to at least one additional piece of information corresponding to an additional transaction account verification technique. The user computing device can then generate a user verification token representative of the transaction details corresponding to the first and second transaction and at least one additional piece of information corresponding to an additional transaction account verification technique. The user computing device transmits the user verification token to a service provider for validating the transaction account.

BRIEF DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIG. 2 is a block diagram illustrative of a system for verifying user transaction accounts via verification tokens including user computing devices, service provider computing devices, and financial service provider computing devices;

FIG. 3B is a block diagram of the system of FIG. 2 illustrating the generation and processing of a transaction account verification tokens for verifying transaction accounts;

DETAILED DESCRIPTION

Figure 1:
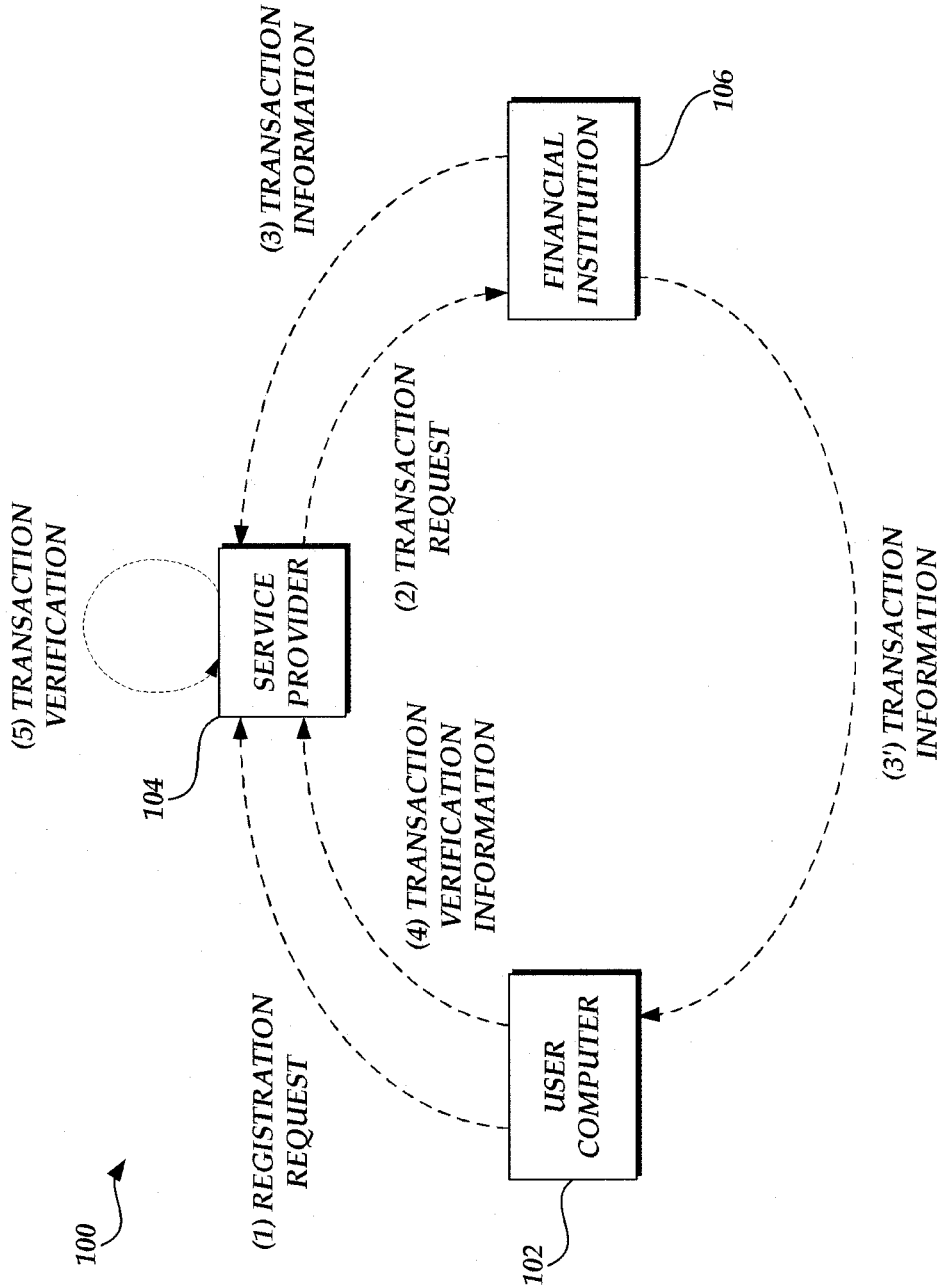
FIG. 1 is a block diagram illustrative of a conventional system for verifying user transaction accounts including a user computing device, a service provider computing device, and a financial services computing device.

Generally described, the presently disclosed subject matter relates to a system and method for facilitating the verification of transaction accounts in a networked environment. More specifically, the presently disclosed subject matter relates to a system and method for verifying aspects of a transaction account through the utilization of verification tokens representative of financial transactions associated with the transaction account and at least one additional piece of information associated with an account verification technique. The specific account verification technique and corresponding piece of additional data can be selected by a user and be used by a service provider to set transaction amount thresholds. One skilled in the relevant art will appreciate, however, that the disclosed embodiments of system components, algorithms, and screen displays are illustrative in nature and should not be construed as limiting.

FIG. 2 is a block diagram illustrative of a system 200 for verifying user transaction accounts via verification tokens in accordance with an aspect of the presently disclosed subject matter. The system 200 includes one or more user computing devices 202 operable to communicate with various components via a communication network, such as a Wide Area Network (e.g., Internet) or a Local Area Network. The user computing devices 202 can correspond to a number of computing devices such as personal computers, server computers, hand-held computers, mobile telephones, embedded computing devices, and the like. Each user computing device can include a variety of hardware/firmware/software components for the operation of the computing device and which will not be described in greater detail. Additionally, in an illustrative embodiment, that user computing device 202 can include a number of additional computer-executable components executed by the user computing device 202 for facilitating the management of user transaction account.

In one aspect, the user computer 202 can include a service provider interface 204 for communicating with a service provider computing device 210, which will be described in greater detail below. In another aspect, user computer 202 can also include a financial service provider interface 206 for communicating with a financial service provider computing device 220, which will also be described in greater detail below. In an illustrative embodiment, the server provider interface 204 and/or the financial service provider interface 206 may correspond to graphical user interfaces generated by a multi-purpose software application, such as a browser application, being executed on the user computing device 202. In a further aspect, the user computer 202 can include a data processing application 208 for generating a user verification token from various user inputs as will also be described below.

The system 200 also includes a service provider computing device 210 operable to communicate with various components, such as the user computing devices 202, via the communication network. The service provider computing device can correspond to a number of computing devices such as personal computers, server computers, handheld computers, mobile telephones, embedded computing devices, and the like. Although the service provider computing device 210 is illustrated as a single computing device, one skilled in the art will appreciate that the service provider computing device can correspond to a number of networked computing devices for providing the functions associated with the illustrated service provider computing device 210. Each such computing device can include a variety of hardware/firmware/software components for the operation of the computing device and which will not be described in greater detail. In an illustrative embodiment, the service provider computing device 210 can include a number of additional computer-executable components executed by the service provider computing device 210 for facilitating the management of user transaction accounts.

In one aspect, the service provider computing device 210 can include a user computer interaction component 212 for communicating with the user computing devices 202, which will be described in greater detail below. In another aspect, the service provider computing device 210 can also include a financial service provider interface 214 for communicating with a financial service provider computing device 220, which will also be described in greater detail below. In a further aspect, the service provider computing device 210 can include a data processing application 216 for generating service provider verification tokens based on a set of financial transactions associated with a user and an account verification technique. The data processing application 216 can also match user verification tokens with the service provider verification tokens to verify transaction accounts and/or set corresponding transaction amount limits as will also be described below. The service provider computing device 210 can further include a data store 218 for maintaining sets of verification tokens to be utilized by the data processing application 216.

With continued reference to FIG. 2, the system 200 can also include one or more financial service provider computing devices 220 associated with financial service providers that can maintain transaction accounts for users or on behalf of users. The financial service provider computing device 220 can correspond to a number of networked computing devices for providing the functions associated with the illustrated financial service provider computing device 220, such as personal computers, server computers, handheld computers, mobile telephones, embedded computing devices, and the like. Each such computing device can include a variety of hardware/firmware/software components for the operation of the computing device and which will not be described in greater detail. In an illustrative embodiment, the financial service provider computing device 220 can include a number of additional computer-executable components executed by the financial service provider computing device 220 for facilitating the management of user transaction account.

In one aspect, the financial service provider computing device 220 can include a user computer communication component 222 for communicating with the user computing devices 202, which will be described in greater detail below. In another aspect, the financial service provider computing device 220 can also include a service provider interface 224 for communicating with the service provider computing device 210, which will also be described in greater detail below.

Figure 3A:
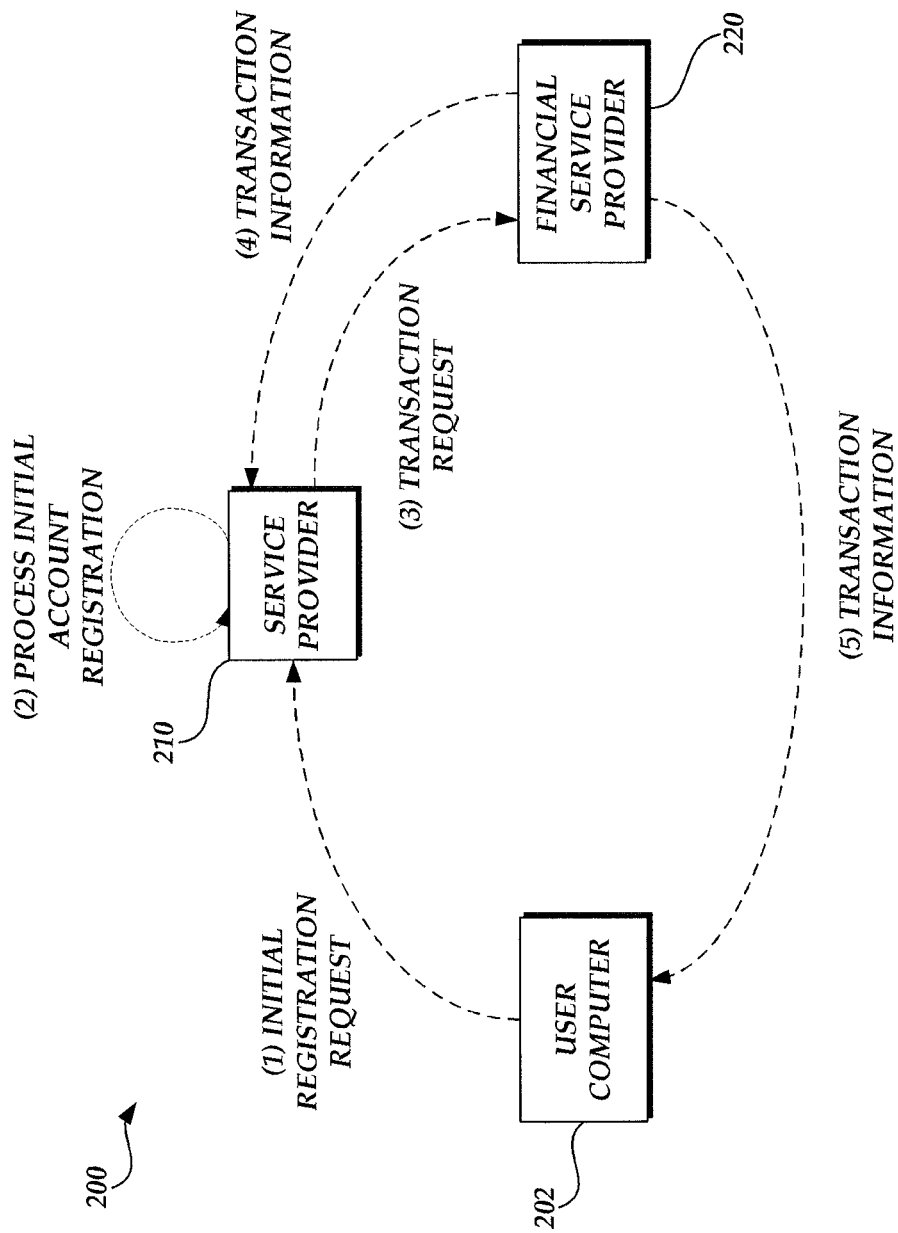
FIG. 3A is a block diagram of the system of FIG. 2 illustrating the transmission of a transaction account verification request and a selection of a verification technique by a user computer.

Turning now to FIGS. 3A and 3B, an illustrative interaction between the components of the system 200 for verifying user transaction accounts will be described. With reference to FIG. 3A, the user computing device 202 transmits an initial registration request to the service provider computing device 210. The initial registration request can include a wide variety of registration information, such as contact information and financial information. Additionally, the initial registration request can include a selection of an account verification technique, as will be described in greater detail below. The service provider computing device 210 processes the initial registration request to create an online account for the user in accordance with the information provided in the request. Additionally, the processing of the initial registration request can include the generation of a set of service provider verification tokens that will be used to verify the transaction accounts according to the selected verification technique identified in the request.

Upon processing the initial request, the service provider computing device 210 initiates a series of actions for verifying one or more transaction accounts identified by the user. The actions can include the initiation of one or more transaction requests with a corresponding financial service provider computing device 220. Additionally, the actions can include the collection, generation, and/or delivery of additional pieces of information associated with the selected verification technique. Various verification techniques will be described in greater detail below. Upon receipt of the transaction request from the service provider computing device 210, the financial service provider completes the requested transactions and transmits records of the transactions to the user computing device 202 and the service provider computing device 210. One skilled in the relevant art will appreciate that the record of the transaction can be delivered in a variety of manners including, but not limited to, electronic messages, Web page interfaces, and mailed transaction records.

With reference now to FIG. 3B, upon receipt of the transaction information from the financial service provider and the collection or receipt of the additional information required for the selected verification technique, the user computing device obtains input from the user corresponding to the transaction information and the additional information for verifying the transaction account. Based on the user input, the user computing device 202 generates a user verification token reflective of the user input and transmits the processing information to the service provider computing device 210. In turn, the service provider computing device 210 compares the user verification token with the set of verification tokens it previously generated. If the tokens match, the service provider computing device 210 verifies the transaction account. Additionally, the service provider computing device 210 can set transaction thresholds for each subsequent transaction associated with the transaction account based on the selected verification technique.

Figure 4:
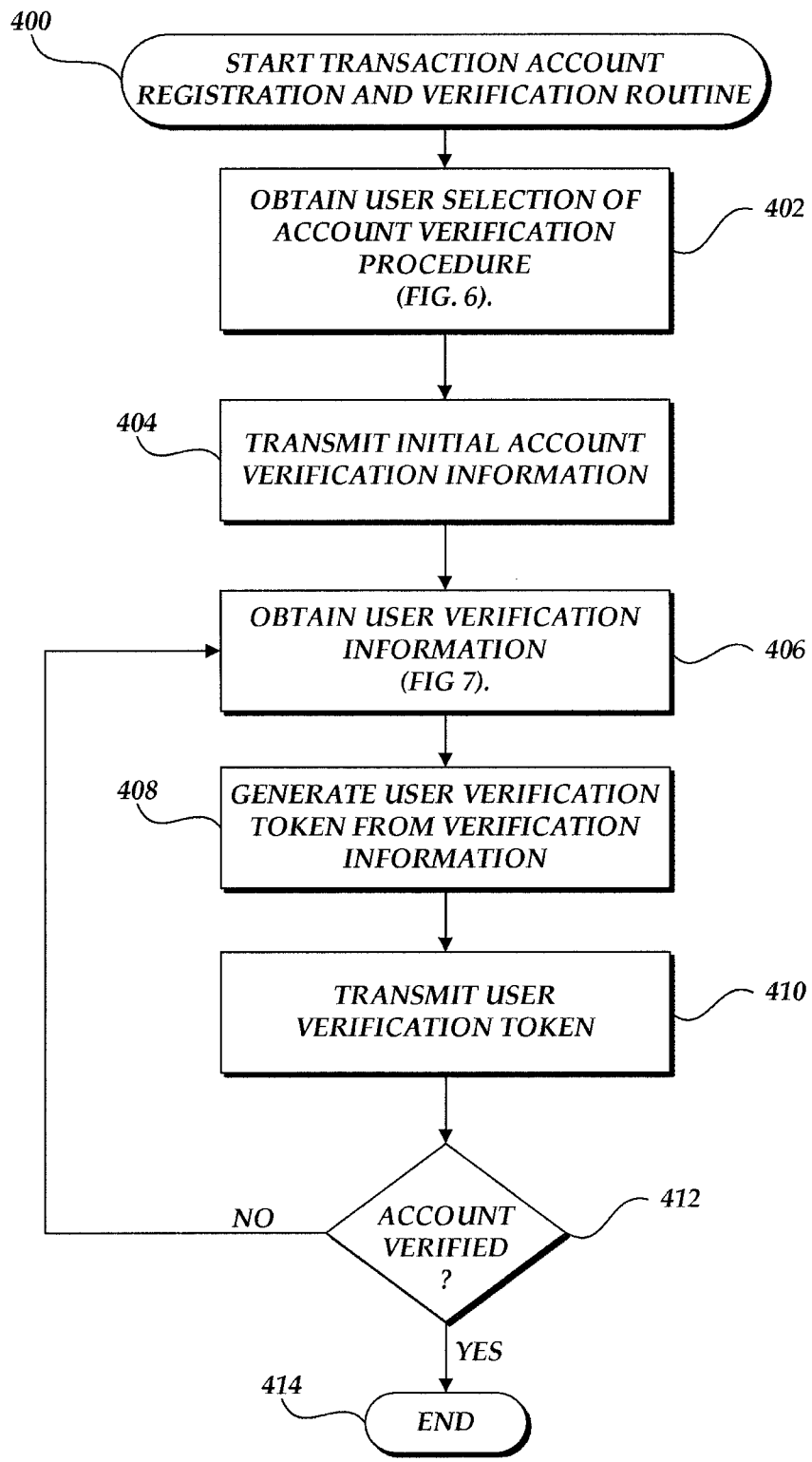
FIG. 4 is a flow diagram illustrative of a user transaction account and verification routine implemented by a user computing device in accordance with an aspect of the presently disclosed subject matter.

With reference now to FIG. 4, a user transaction account and verification routine 400 implemented by a user computing device 202 will be described. At block 402, the user computing device 202 obtains a transaction account registration request. As described above, the transaction account registration request can include a request for necessary and optional information associated with the creation of an online account with the service provider such as contact information, passwords, PINs, secret questions/answers, financial information such as contact information, account numbers and routing numbers, background information, and the like. Additionally, the transaction account registration request can include a selection of a transaction account verification techniques. In an illustrative embodiment, a transaction account verification technique can correspond to the processing of one or more pieces of information in addition to the financial transaction information. Examples of the additional piece of information can include, but are not limited to, user identification information, telephone numbers, PINs, passwords, answers to secret questions, user computing device identification information, secondary financial account information, familial relation information and/or identifying information from some type of communication (e.g., date, time, origin, etc.). In an alternative embodiment, the verification technique may be assigned in advance or a default technique may be selected. One skilled in the relevant art will appreciate that multiple verification techniques may be applied or otherwise combined to validate a single transaction account. Moreover, the selection of a specific verification technique does not necessarily exclude any additional verification techniques.

Based, in part, on the additional information provided by the user, the service provider can associate a security risk associated with the user's financial account and set corresponding transaction thresholds. For example, by verifying the user's physical address, the service provider can associate a specific level of security risk. However, by verifying a user's previous answer to a secret question or a password, the service provider can associate a different level of security risk. The user selection registration request can be obtained by displaying a user interface provided by the service provider computing device 210. In an illustrative embodiment of the presently disclosed subject matter, the display can correspond to a Web-based interface generated in response to request from a user as will be described in greater detail with regard to FIG. 6. At block 404, the transaction account registration request is transmitted to the service provider computing device 210.

At block 406, the user computing device 202 obtains user input corresponding to requested transaction verification information. In one aspect, a user may receive a report from the financial service provider computing device 220 (or directly from the financial service provider) indicative of one or more transactions initiated by the service provider. The report can include an identification of a specific service provider account number, the transaction amount for each transaction, the date of the transaction, and/or additional data included in the report such as a PIN, password, or other text.

In another aspect, the user may receive additional communications from the service provider indicative of an additional piece of information requested to verify the transaction account. Examples of the additional communications include electronic mails including PINs, passwords, customized hyperlinks or other text, physical mail including printed PINs, passwords, customized hyperlinks or other text and/or scratch-off cards, telephone calls, text messages, instant messages, customized Web pages, and the like. In a further aspect, users may be asked to collect/provide other information such as social security numbers, previously established passwords, answers to secret questions, contact information such as address, telephone number, or other personal information as previously described. Depending on the verification technique requested in the transaction account registration request, the user may be prompted to enter the appropriate information to the user computing device 202 via a graphical display. In an illustrative embodiment of the presently disclosed subject matter, the display can correspond to a Web-based interface generated in response to request from a user as will be described in greater detail with regard to FIG. 7.

At block 408, the data processing application 208 generates a user verification token reflective of the user input. In an illustrative embodiment, the user verification token can correspond to a unique representation of the user input that does not include the underlying information, such as a hash. The specific algorithm, or software code portion, necessary to generate the verification token can be provided to the user computing device 202 by the service provider computing device. One skilled in the relevant art will appreciate that algorithms for generating hashes are well known in the art and any variety of such algorithms may be utilized to generate the user verification token in accordance with the disclosed subject matter. Accordingly, hashing algorithms will not be described in greater detail. At block 410, the server provider interface 204 transmits the user verification token to the service provider computing device 210.

At decision block 410, a test is conducted to determine whether the transaction account has been verified. In an illustrative embodiment, the data processing application 216 of the service provider computing device 210 will attempt to match the user verification token with a set of service provider verification tokens. Accordingly, the user computer interaction component 212 of the service provider computing device 210 may transmit a message indicative of a matching success/failure to the user computing device 202. In the event that the account cannot be verified, the routine 400 can return to block 406 to obtain additional user input corresponding to requested transaction verification information. In an illustrative embodiment, the service provider cannot tell which piece of verification information was incorrectly provided because it is not comparing the underlying data, but only a hash of the cumulative set of verification information. Accordingly, the user may be required to input all the requested verification information again. With continued reference to decision block 410, if the account is verified, that routine 400 terminates at block 414.

Figure 5:
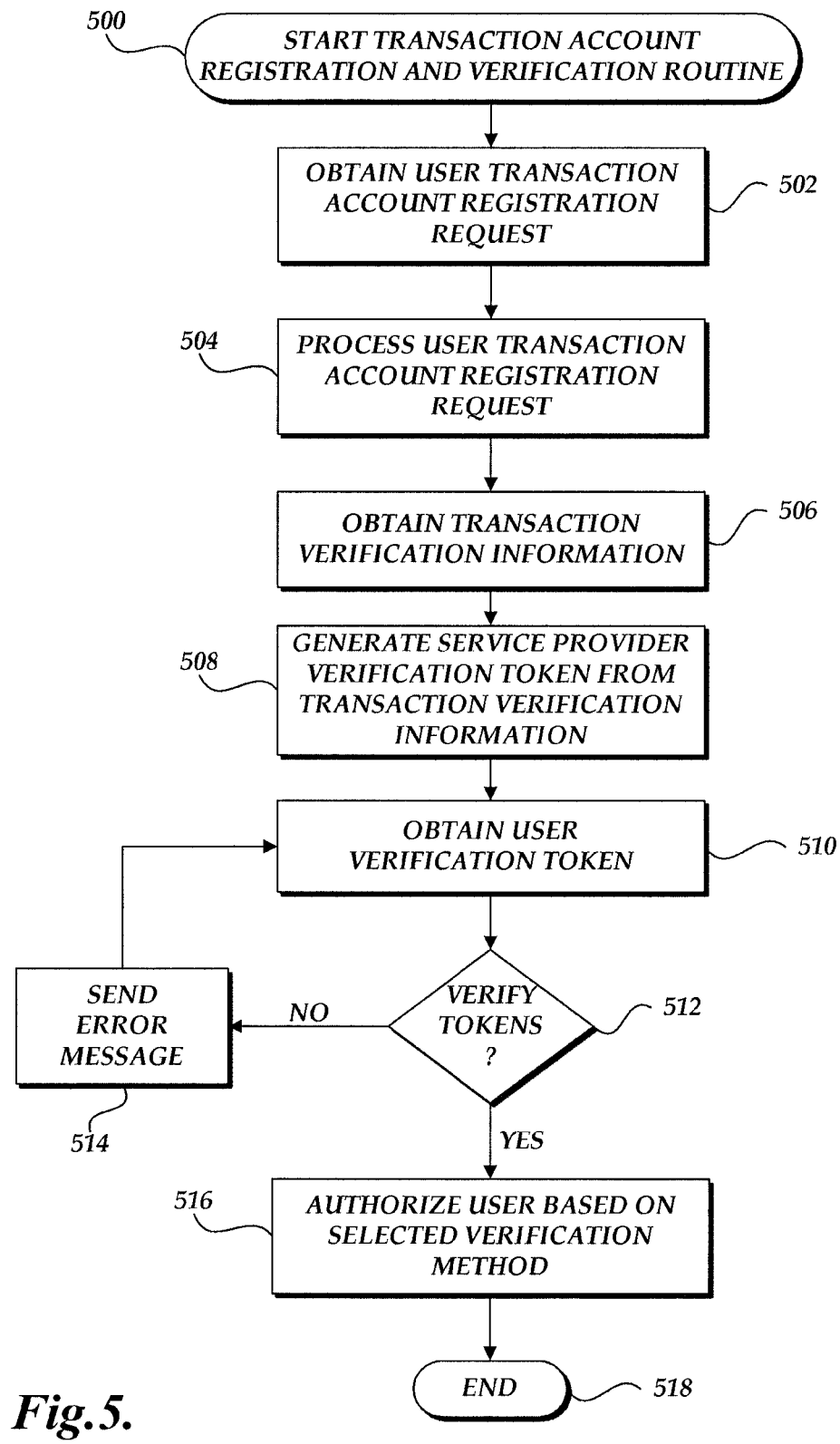
FIG. 5 is a flow diagram illustrative of a user transaction account and verification routine implemented by a service provider computing device in accordance with an aspect of the presently disclosed subject matter.

With reference now to FIG. 5, a user transaction account and verification routine 500 implemented by a service provider computing device 210 will be described. At block 502, the service provider computing device 210 obtains a transaction account registration request from a user computing device 202. As described above, the transaction account registration request can include a request for necessary and optional information associated with the creation of an online account with the service provider. Additionally, the transaction account registration request can include a selection of transaction account verification techniques. In an illustrative embodiment, a transaction account verification technique can correspond to the processing of one or more pieces of information in addition to the financial transaction information. In an alternative embodiment, the verification technique may be assigned in advance by the service provider computing device 210 or the user computing device 202. Additionally, the service provider computing device 210 can assign a verification technique based on the information included in the transaction account registration request and/or additional information, such as a credit risk score, etc.

At block 504, the service provider computing device 210 processes the transaction account registration request from the user computing device 202. In one aspect, the financial institution interface 214 may initiate a request to the financial service provider computing device 220 to perform a set of defined financial transactions with an account identified in the transaction account registration request. The request can include the inclusion of additional information into a transaction record provided to a user associated with the transaction account, as previously described. In another aspect, the user computer interaction component 212 may also initiate the generation or collection of additional information from the user computing device 202 corresponding to the selected verification technique. Examples can include the generation of various communications to the user computing device 202, or user directly, such as electronic mails including PINs, passwords, customized hyperlinks or other text, physical mail including printed PINs, passwords, customized hyperlinks or other text and/or scratch-off cards, telephone calls, text messages, instant messages, customized Web pages, and the like. Additionally, the user computer interaction component 212 can include bi-directional communications for collecting other information such as social security numbers, previously established passwords, answers to secret questions, contact information, such as address, telephone number, or other personal information as previously described.

At block 506, the service provider computing device 210 obtains additional transaction verification information. In one aspect, the service provider computing device 210 may receive a report from the financial service provider computing device 220 indicative of one or more transactions that were previously requested by the service provider. In another aspect, the service provider computing device 210 may receive additional information confirming the delivery of required communications or the collection of user information, such as user secret question answers, personal information, passwords, etc.

At block 508, the data processing application 216 generates a service provider verification token reflective of the collected or generation transaction information. In an illustrative embodiment, the service verification token can correspond to a unique representation of the transaction information that does not include the underlying information, such as a hash. One skilled in the relevant art will appreciate that algorithms for generating hashes are well known in the art and any variety of such algorithms may be utilized to generate the service provider verification token in accordance with the disclosed subject matter. Additionally, the data processing application 216 does not need to maintain any of the underlying transaction data and the data processing application 216 can discard some or all of the information, such as confidential information.

In an illustrative embodiment of the presently disclosed subject matter, a user at the user computing device 202 may be presented with the ability to select, or have selected, which of two or more pieces of additional data will be utilized to generate the user verification token. For example, the initial registration request may prompt a user to provide answers to five secret questions. In turn, the user, user computing device 202, or the service provider 210 may select which of the secret questions will be utilized to generate the user verification token. In another example, which piece of financial information may also be dynamically selected by the user, user computing device 202, or the service provider computing device 210. Because the user verification token generation process may be dynamic in nature and not necessarily pre-defined, the data processing application 216 may generate and store a set of service provider verification tokens for all possible combinations of transaction information and additional pieces of information.

At block 510, the user computer interaction component 212 obtains a user verification token from the user computing device 202. At decision block 512, the data processing application determines whether the user verification token matches the set of service provider verification tokens. In an illustrative embodiment, the data processing application may attempt to match the user verification token against a single service provider verification token or against a set of possible service provider verification tokens. If the data processing application 216 cannot match the user verification token, the user computer interaction component 212 transmits an error message and the routine 500 returns to block 510. As described above, in an illustrative embodiment, the service provider computing device 210 cannot tell which piece of verification information was incorrectly provided because it is not comparing the underlying data, but only a hash of the cumulative set of verification information. Accordingly, the reporting error may only identify that a match did not occur and may not identify which piece of information was incorrect.

With continued reference to decision block 512, if the user verification token matches a service provider verification token, the service provider computing device 210 verifies the transaction account. Additionally, the service provider computing device 210 can associate transaction limits in accordance with the selected verification technique. At block 518, the routine 500 terminates.

Figure 6:
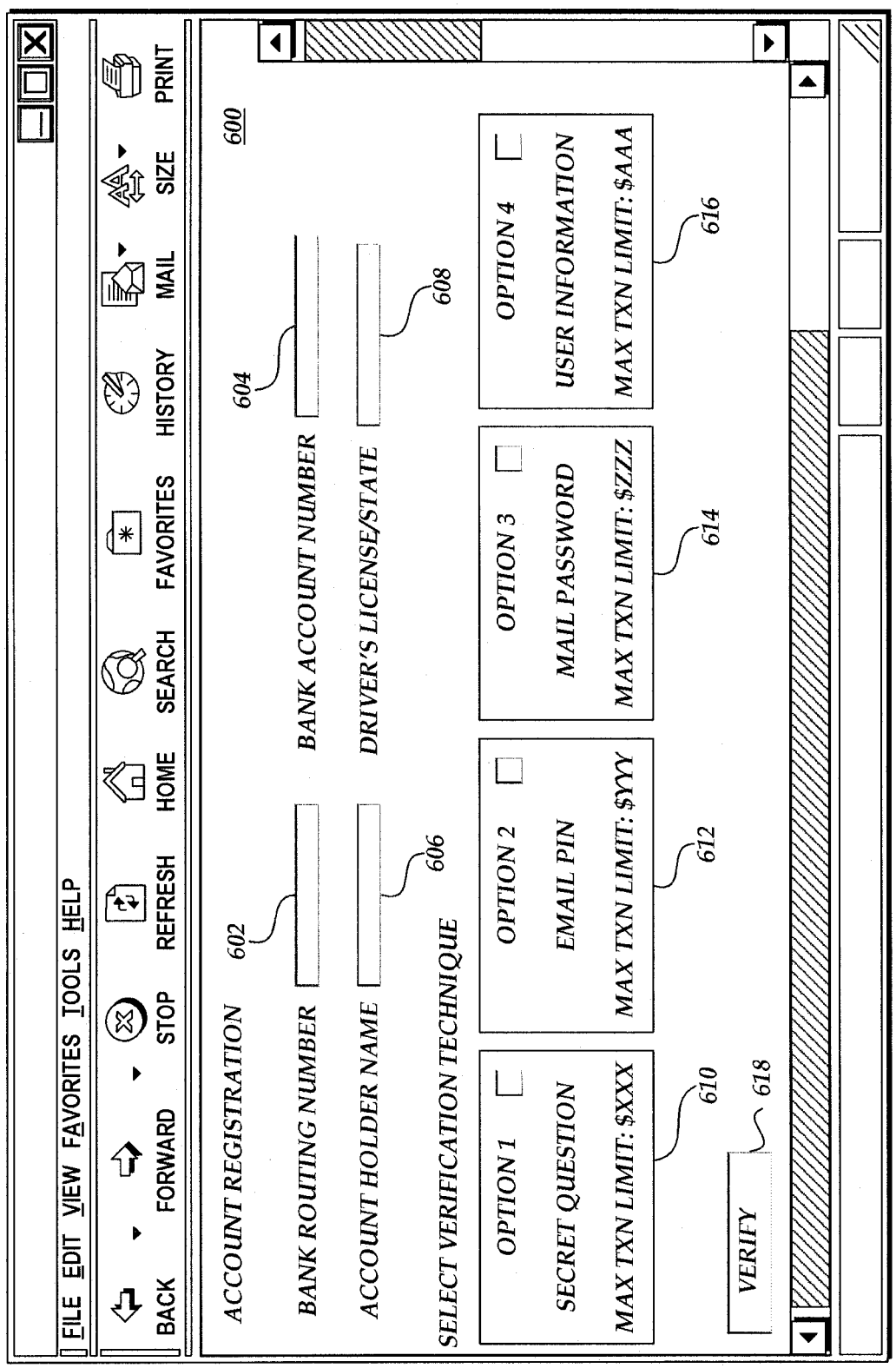
FIG. 6 is a block diagram illustrative of a screen display generated by a user computing device for obtaining user input corresponding to the selection of a verification technique in accordance with a transaction account generation request.
Figure 7:
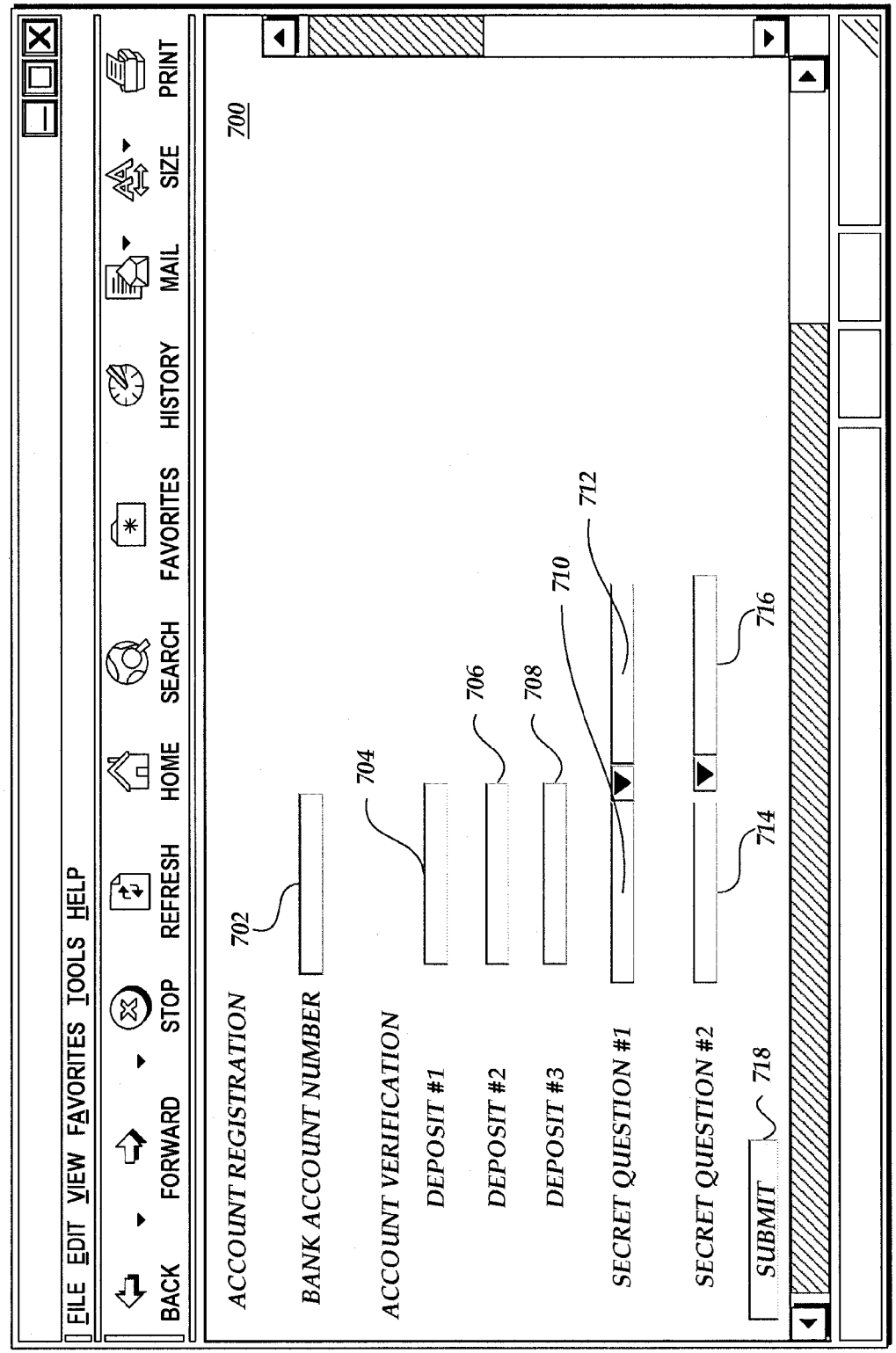
FIG. 7 is a block diagram illustrative of a screen display generated by a user computing device for obtaining use input corresponding to the submission of financial transaction information and an additional piece of information for generating verification tokens.

With reference now to FIGS. 6 and 7, illustrative screen displays for obtaining user input for initiating a transaction account registration and for verifying a transaction account will be described. With reference to FIG. 6, a screen display 600 generated by a user computing device 202 for obtaining user input corresponding to the selection of a verification technique will be described. The screen display 600 may be utilized in conjunction with the collection of user inputs as described in block 402 (FIG. 4). In a first portion, the screen display 600 includes a number of fields for information about the transaction account to be utilized by the service provider. In an illustrative embodiment, the transaction account can correspond to a bank checking account. Accordingly, the fields can include a field 602 for obtaining a bank routing number, a field 604 for obtaining a bank account number, a field 606 for obtaining the account holder's name, and a field 608 for obtaining identification information, such as driver's license number, for the named account holder. One skilled in the relevant art will appreciate that any number of additional or alternative fields may also be utilized in conjunction with the screen display 600. Additionally, at least some portion of the information may be pre-populated by the user computing device 202 or the service provider computing device 210 based upon information stored on the computing devices, such as a user profile.

With continued reference to FIG. 6, the screen display 600 can also include a second portion for obtaining a user selection of a transaction account verification technique. In an illustrative embodiment, the screen display 600 can provide users with various options for verifying transaction accounts. Because the service provider computing device 210 can associate different transaction thresholds with the various verification techniques, the screen display 600 can include an indication of the transaction amount threshold associated with the verification technique. Alternatively, the screen display can only provide an indirect reference to the transaction amount threshold, such as by indicating relative levels of security (e.g., "silver, gold, platinum" or "low, medium, high," or the like). As illustrated in FIG. 6, the screen display 600 includes an identification of four verification technique options 610, 612, 614, and 616 that can be selected by a user. The four verification technique options 610, 612, 614, and 616 can include some description of the verification technique and additional information regarding transaction amount thresholds. In an illustrative embodiment, one or more verification techniques may be pre-selected by the service provider computing device 210 or one or more of four verification technique options may be unavailable to the user. The screen display 600 further includes a control 618 for initiating the transmittal of the transaction registration request from the user computing device 202 to the service provider computing device 210.

With reference to FIG. 7, a screen display 700 generated by a user computing device 202 for obtaining user input corresponding to the collection of requested transaction account verification information will be described. The screen display 700 may be utilized in conjunction with the collection of user inputs as described in block 406 (FIG. 4). The screen display 700 includes a first portion for identifying the transaction account to be verified, such as bank account number field 702. In an illustrative embodiment, the same screen display 700 can be utilized to verify a number of transaction accounts. Accordingly, the user could be prompted to identify which transaction account will be verified. Alternatively, field 702 may be pre-populated by the service provider computing device 210.

The screen display 700 also includes a second portion for obtaining user input for the required transaction account verification information. The second portion can include fields 704, 706, and 708 for obtaining details of the transactions initiated by the service provider computing device 210 and reported to the user. As illustrated in FIG. 7, fields 704, 706, and 708 can be used to collect information regarding three separate deposits made to the specified transaction accounts, such as deposit amounts, deposit dates, information in various text fields of the report, service provider account numbers, and the like. Additionally, fields 704, 706, and 708 can request the same type of information or, alternatively, different types of information regarding the transactions, such as account numbers, transaction dates, and the like. One skilled in the relevant art will appreciate that the number of transactions utilized to validate the transaction account may vary.

The second portion of the screen display 700 can also include a set of fields 710, 712, 714, and 716 for obtaining an additional piece of information corresponding to a selected transaction account verification technique. As illustrated in FIG. 7, the set of fields 710, 712, 714, and 716 includes drop down fields 710 and 714 for allowing a user to select from a set of "secret" questions they have previously registered with the service provider and data entry fields 712 and 716 for providing the "answer" to a selected secret question. In an illustrative embodiment of the presently disclosed subject matter, fields 710, 712, 714, and 716 facilitate a user selection from two or more secret questions, the answer of which will be utilized to generate the user verification token. One skilled in the relevant art will appreciate, however, that fields 710, 712, 714, and 716 may be configured to obtain user input regarding different additional pieces of information depending on the selected verification technique. The screen display 700 further includes a control 718 for initiating the transmittal of the requested transaction verification information from the user computing device 202 to the service provider computing device 210.

While illustrative embodiments have been illustrated and described, it will be appreciated that various changes can be made therein without departing from the spirit and scope of the disclosed subject matter.

What is claimed is:

1. A method for managing user transaction accounts comprising:
    obtaining a user registration request, the registration including an identification of a user transaction account associated with a financial service provider and a selection of a transaction account verification technique;
    transmitting the registration request to a service provider computing device, wherein the service provider computing devices is configured to transmit to a user computing device information corresponding to a plurality of transaction account verification techniques and a plurality of transaction amount thresholds, wherein individual transaction account verification techniques of the plurality of transaction account verification techniques correspond to a transaction amount threshold of the plurality of transaction amount thresholds, and wherein the plurality of transaction amount thresholds are varied based at least in part on the corresponding transaction account verification technique;

causing generation of a representation of the plurality of transaction account verification techniques and the plurality of transaction amount thresholds for output to a user of the user computing device;

in response to said output, obtaining user selection of a transaction account verification technique of the plurality of transaction account verification techniques and a corresponding transaction amount threshold of the plurality of transaction amount thresholds;

generating a user verification token representative of the user selection; and transmitting the user verification token representative of the user selection to the service provider without transmitting the user selection.

2. The method of claim 1, wherein the selected transaction account verification technique corresponds to a verification of at least one of a personal identification number, user contact information, an answer to a security question, a transaction amount associated with a financial transaction, or a password.

3. The method of claim 2, wherein the user verification token is generated based at least in part on at least two of a personal identification number, user contact information, an answer to a security question, a transaction amount associated with a financial transaction, or a password.

4. The method of claim 1, wherein the user verification token comprises at least one of a personal identification number, user contact information, an answer to a security question, a transaction amount associated with a financial transaction, or a password.

5. The method of claim 1, wherein the user verification token comprises a hash value.

6. A system for managing a user transaction account, the system comprising:

one or more processors configured with specific computer-executable instructions that, when executed, cause the one or more processors to:

in response to a request for registration of a transaction account, transmit information corresponding to a plurality of verification techniques and a plurality of transaction amount thresholds to a user computing device for output to a user of the user computing device, wherein individual verification techniques of the plurality of verification techniques correspond to a transaction amount threshold of the plurality of transaction amount thresholds, and wherein the plurality of transaction amount thresholds are varied based at least in part on the corresponding transaction account verification technique;

in response to output of the plurality of verification techniques and the plurality of transaction amount thresholds, receive from the user computing device a selection of a verification technique of the plurality verification techniques and a corresponding transaction amount threshold of the plurality of transaction amount thresholds;

generate first verification information based at least in part on the selected verification technique;

obtain from a user second verification information based at least in part on the selected verification technique; and in response to a determination that the first verification information corresponds to the second verification information, associate the user transaction account with the transaction amount threshold corresponding to the selected verification technique.

7. The system of claim 6, wherein the first verification information comprises at least one of a personal identification number, user contact information, an answer to a security question, a transaction amount associated with a financial transaction, or a password.

8. The system of claim 6, wherein the first verification information comprises a password, and wherein determining that the first verification information corresponds to the second verification information comprises determining that the password matches a password included within the second verification information.

9. The system of claim 6, wherein the first verification information comprises a service provider verification token, and wherein the second verification information comprises a user verification token.

10. The system of claim 9, wherein determining that the first verification information corresponds to the second verification information comprises determining that the user verification token matches to the service provider verification token.

11. The system of claim 6, wherein the computer-executable instructions further cause the one or more processors to receive an identifier of a second transaction account associated with a financial service provider.

12. The system of claim 11, wherein the computer-executable instructions further cause the one or more processors to initiate at least one transaction with the financial service provider based at least in part on the identifier of the second transaction account, and wherein the first verification information and the second verification information are further based at least in part on the at least one transaction.

13. A non-transitory computer-readable storage medium having at least one computer-executable module for managing a transaction account, the at least one computer-executable module comprising:

a threshold management module configured to:

responsive to a request to create a transaction account, transmit information corresponding to a plurality of verification techniques and a plurality of distinct transaction amount thresholds to a user computing device for output to a user of the user computing device, wherein individual verification techniques of the plurality of verification techniques correspond to a distinct transaction amount threshold of the plurality of distinct transaction amount thresholds;

in response to output of the plurality of verification techniques and the plurality of distinct transaction amount thresholds to the user, receive from the user computing device a selection of a verification technique of the plurality verification techniques and a corresponding transaction amount threshold of the plurality of transaction amount thresholds;

verify a set of user information corresponding to the selected verification technique; and associate the transaction account with the distinct transaction amount threshold corresponding to the selected verification technique.

14. The non-transitory computer-readable storage medium of claim 13, wherein the threshold management module is further configured to generate a set of verification information based at least in part on the selected verification technique.

15. The non-transitory computer-readable storage medium of claim 13, wherein the threshold management module is configured to verify the set of user information based at least in part on a comparison of the set of user information with the generated set of verification information.

16. The non-transitory computer-readable storage medium of claim 13, wherein set of user information comprises at least one of a personal identification number, user contact information, an answer to a security question, a transaction amount associated with a financial transaction, a password, a token, or a hash value.

17. The non-transitory computer-readable storage medium of claim 13, wherein the threshold management module is further configured to:
receive a request to increase the transaction amount threshold associated with the transaction account;
verify a second set of user information based at least in part on an additional verification technique of the plurality of verification techniques, wherein the distinct transaction amount threshold associated with the additional verification technique is larger than the transaction amount threshold associated with the transaction account; and
associate the transaction account with the distinct transaction amount threshold corresponding to the additional verification technique.

18. The non-transitory computer-readable storage medium of claim 13, wherein each of the plurality of distinct transaction amount thresholds is varied based at least in part on the corresponding transaction account verification technique.

19. A computer-implemented method for managing a transaction account, the computer-implemented method comprising:
transmitting, from one or more computing devices, information corresponding to a plurality of verification techniques and a plurality of distinct transaction amount thresholds to a user computing device for output to a user of the user computing device, wherein individual verification techniques of the plurality of verification techniques correspond a distinct transaction amount threshold of the plurality of distinct transaction amount thresholds;
in response to output of the plurality of verification techniques and the plurality of distinct transaction amount thresholds to the user, receiving, at the one or more computing devices, from the user computing device a selection of at least one verification technique and at least one corresponding distinct transaction amount threshold;
verifying, at the one or more computing devices, a set of user information corresponding to the selected at least one verification technique; and
associating, at the one or more computing devices, the transaction account with the selected at least one distinct transaction amount threshold.

20. The computer-implemented method of claim 19, wherein verifying the set of user information comprises:
generating a set of verification information based at least in part on the selected at least one verification technique; and
determining that the set of user information corresponds to the set of verification information.

21. The computer-implemented method of claim 19, wherein set of user information comprises at least one of a personal identification number, user contact information, an answer to a security question, a transaction amount associated with a financial transaction, a password, a token, or a hash value.

22. The computer-implemented method of claim 19 further comprising:
receiving a request to increase the transaction amount threshold associated with the transaction account;
verifying a second set of user information based at least in part on an additional verification technique of the plurality of verification techniques, wherein the distinct transaction amount threshold associated with the additional verification technique is larger than the transaction amount threshold associated with the transaction account; and
associating the transaction account with the distinct transaction amount threshold corresponding to the additional verification technique.

23. The computer-implemented method of claim 19 further comprising initiating at least one transaction with a financial service provider based at least in part on a received identifier of a second transaction account.

24. The computer-implemented method of claim 23, wherein the set of user information is further based at least in part on the at least one transaction.

\* \* \* \* \*